(12) United States Patent
Maurano et al.

(10) Patent No.: US 11,664,529 B2
(45) Date of Patent: May 30, 2023

(54) BUFFERED NEGATIVE ELECTRODE-ELECTROLYTE ASSEMBLY, BATTERY, AND METHOD OF MANUFACTURE THEREOF

(71) Applicants: Samsung Electronics Co., Ltd., Suwon-si (KR); MASSACHUSETTS INSTITUTE OF TECHNOLOGY, Cambridge, MA (US)

(72) Inventors: Andrea Maurano, Boston, MA (US); Srinath Chakravarthy, Glastonbury, CT (US); Ju Li, Weston, MA (US); Ziqiang Wang, Cambridge, MA (US); Yuming Chen, Fuzhou (CN); Kai Pei, Xincheng District (CN); Jennifer Lilia Marguerite Rupp, Cambridge, MA (US)

(73) Assignees: SAMSUNG ELECTRONICS CO., LTD., Gyeonggi-do (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 191 days.

(21) Appl. No.: 17/144,687

(22) Filed: Jan. 8, 2021

(65) Prior Publication Data
US 2022/0052374 A1 Feb. 17, 2022

Related U.S. Application Data

(60) Provisional application No. 63/065,353, filed on Aug. 13, 2020.

(51) Int. Cl.
*H01M 10/0562* (2010.01)
*H01M 10/058* (2010.01)
(Continued)

(52) U.S. Cl.
CPC ....... *H01M 10/0562* (2013.01); *H01M 4/131* (2013.01); *H01M 4/136* (2013.01);
(Continued)

(58) Field of Classification Search
CPC ........... H01M 10/0562; H01M 10/058; H01M 2004/027
See application file for complete search history.

(56) References Cited

U.S. PATENT DOCUMENTS 9,741,999 B2   8/2017 Prieto et al.
2015/0084157 A1* 3/2015 Tegen ............... H01M 10/4257
                                                    257/528
(Continued)

OTHER PUBLICATIONS

Li et al., A functional SrF2 coated separator enabling a robust and dendrite-free solid electrolyte interphase on a lithium metal anode, J. Mater. Chem. A, 2019,7, 21349-21361, available at https://doi.org/10.1039/C9TA06908A (Year: 2019).*

(Continued)

*Primary Examiner* — Ula C Ruddock
(74) *Attorney, Agent, or Firm* — Cantor Colburn LLP

(57) ABSTRACT

A buffered negative electrode-electrolyte assembly includes: a porous negative electrode comprising a metal, a transition metal nitride, or a combination thereof; a solid-state electrolyte; and a buffer layer between the porous negative electrode and the solid-state electrolyte. The buffer layer comprising a buffer composition according to Formula (1) $M_m N_n Z_z H_h X_x$. The buffer composition has an electronic conductivity that is less than or equal to $1 \times 10^{-2}$ times an electronic conductivity of the solid-state electrolyte, and the buffer composition has an ionic conductivity less than or equal to $1 \times 10^{-6}$ times an ionic conductivity of the solid-state electrolyte.

20 Claims, 6 Drawing Sheets

(51) Int. Cl.
　　　*H01M 4/136*　　(2010.01)
　　　*H01M 4/58*　　　(2010.01)
　　　*H01M 4/131*　　(2010.01)
　　　*H01M 4/02*　　　(2006.01)

(52) U.S. Cl.
　　　CPC ........... *H01M 4/58* (2013.01); *H01M 10/058* (2013.01); *H01M 2004/027* (2013.01); *H01M 2004/028* (2013.01)

(56) References Cited

U.S. PATENT DOCUMENTS

| | | | |
|---|---|---|---|
| 2017/0338522 A1* | 11/2017 | Hu | H01M 4/362 |
| 2019/0131660 A1 | 5/2019 | Anandan et al. | |
| 2019/0245239 A1 | 8/2019 | Haverkate et al. | |
| 2019/0267631 A1* | 8/2019 | Brewer | H01M 4/661 |
| 2019/0280328 A1 | 9/2019 | Haga et al. | |
| 2020/0168949 A1* | 5/2020 | Wen | C08F 212/08 |
| 2021/0234153 A1* | 7/2021 | Xiao | H01M 4/366 |

OTHER PUBLICATIONS

Chen et al., "Li metal deposition and stripping in a solid-state battery via Coble creep", Nature, vol. 578, Feb. 3, 2020, 43 pages.

* cited by examiner

BUFFERED NEGATIVE ELECTRODE-ELECTROLYTE ASSEMBLY, BATTERY, AND METHOD OF MANUFACTURE THEREOF

CROSS-REFERENCE TO RELATED APPLICATION

This application claims priority to U.S. Provisional Patent Application No. 63/065,353, filed on Aug. 13, 2020, in the United States Patent and Trademark Office, and all the benefits accruing therefrom under 35 U.S.C. § 119, the content of which is incorporated herein in its entirety by reference.

BACKGROUND

1. Field

Disclosed is a buffered negative electrode-electrolyte assembly, a battery including the same, and a method of manufacture thereof.

2. Description of the Related Art

A solid-state lithium battery can potentially offer improved safety, and in some configurations provide improved specific energy and energy density. However improved reliability is desired. It is understood that detachment of the solid electrolyte from the negative electrode contributes to battery failure. Thus, there remains a need for improved materials to improve the performance of solid-state lithium batteries.

SUMMARY

A buffered negative electrode-electrolyte assembly comprises:
a porous negative electrode comprising a metal, a transition metal nitride, or a combination thereof;
a solid-state electrolyte; and
a buffer layer between the porous negative electrode and the solid-state electrolyte, the buffer layer comprising a buffer composition according to Formula (1)

$$M_n N_n Z_z H_h X_x \quad (1)$$

wherein
M is Na, K, Rb, Cs, Al, or a metal of Group 2 or 3, or a combination thereof, wherein
m is 1, 2, 3, or 4,
X is at least one halogen and wherein x is 0, 1, 2, or 6,
Z is O, S, or a combination thereof, and z is 0, 1, 2, 3, or 4,
n is 0, 1, or 2, and
h is 0, 1, 2, or 3,
provided that x+z+n+h is at least 1,
wherein
the buffer composition has an electronic conductivity that is less than or equal to $1\times10^{-2}$ times an electronic conductivity of the solid-state electrolyte, and the buffer composition has an ionic conductivity less than or equal to $1\times10^{-6}$ times an ionic conductivity of the solid-state electrolyte.

In another aspect, an electrochemical cell comprises: a positive electrode; and the buffered negative electrode-electrolyte assembly as described above on the positive electrode.

The electrochemical cell is manufactured by disposing a buffer layer between a solid-state electrolyte and a porous negative electrode to form the above described buffered negative electrode-electrolyte assembly; and disposing a positive electrode on the solid-state electrolyte to manufacture the battery.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

A solid-state lithium battery includes a negative electrode, a positive electrode, and a solid-state electrolyte between the negative electrode and the positive electrode. It is understood that the positive electrode could alternatively be referred to as a cathode, and the negative electrode as an anode. For the solid-state negative electrode, use of lithium metal or a lithium alloy negative electrode active material is desired because lithium metal or lithium alloy negative electrode active materials can potentially provide improved specific capacity and energy density. However, maintaining contact between the solid-state electrolyte and such negative electrode active materials remains as a persistent problem. While not wanting to be bound by theory, it is understood that as the cell is charged and discharged, lithium ions tend to reduce and precipitate at the interface between the solid-state electrolyte and the negative electrode active material. The volume of the deposited lithium eventually leads to a loss of contact between the solid-state electrolyte and the negative electrode active material. Such reduction of contact can be detrimental for the battery operation, being one of the main causes of battery failure. In extreme cases, such reduction of contact can lead to partial or full detachment of the negative electrode from the solid-state electrolyte, creating effectively an open circuit system.

Use of porous negative electrodes (e.g., nanostructured metal anodes) has been suggested to provide spaces to accommodate the deposited lithium within the nanostructure scaffold. Nonetheless, detachment can still occur. While not wanting to be bound by theory, it is understood that during cycling metal ions tend to chemically reduce and thus precipitate at the interface between the solid-state electrolyte and the porous negative electrode structure. It is understood that with further cycling, precipitation of lithium can still lead to a loss of contact between the solid-state electrolyte and the surface of the porous negative electrode structure, contributing to battery failure.

The inventors have discovered that adding a buffer layer as described herein between a solid-state electrolyte and a porous negative electrode can address and solve the problem of solid-state electrolyte detachment from the negative electrode.

Figure 1:
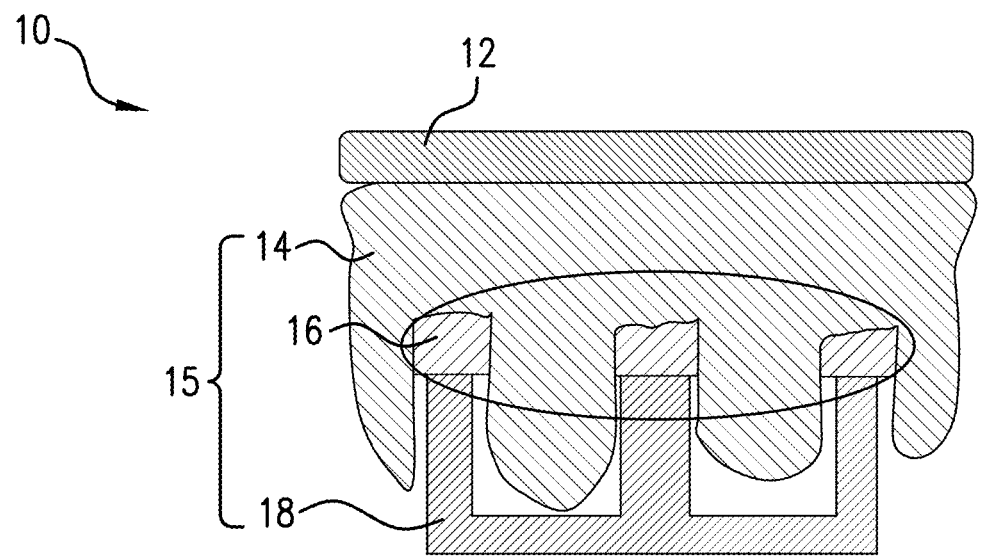
FIG. 1 is a schematic diagram of an embodiment of an electrochemical cell including a buffered negative electrode-electrolyte assembly.

A buffered negative electrode-electrolyte assembly is disclosed. As illustrated in FIG. 1, the buffered negative electrode-electrolyte assembly (15) comprises a porous negative electrode (18); a solid-state electrolyte (14); and a buffer layer (16) between the porous negative electrode (18) and the solid-state electrolyte (14).

In an aspect, the buffer layer is an electronic insulator relative to the solid-state electrolyte. In an aspect, the buffer layer comprises a buffer composition having an electronic conductivity that is less than or equal to $1\times10^{-2}$ times, less than or equal to $0.5\times10^{-2}$ times, less than or equal to $0.1\times10^{-2}$ times an electronic conductivity of the solid-state electrolyte. In an aspect, the buffer composition has an electronic conductivity that is greater than or equal to $1\times10^{-8}$ times, greater than or equal to $1\times10^{-7}$ times, or greater than or equal to $1\times10^{-6}$ times an electronic conductivity of the solid-state electrolyte. An electronic conductivity of the buffer composition can have be greater than or equal to $1\times10^{-14}$ Siemens per meter (S/m), greater than or equal to $1\times10^{-13}$ S/m, or greater than or equal to $1\times10^{-12}$ S/m, to $1\times10^{-6}$ S/m, $1\times10^{-7}$ S/m, or $1\times10^{-8}$ S/m. The electrical conductivity can be determined according to ASTM B-193, "Standard Test Method for Resistivity of Electrical Conductor Materials," e.g., at 20° C., or according to ASTM E-1004, "Standard Test Method for Determining Electrical Conductivity Using the Electromagnetic (Eddy-Current) Method," e.g., at 20° C. Additional details may be determined by one of skill in the art without undue experimentation. The electronic conductivity of the buffer composition and the electronic conductivity of the solid-state electrolyte are measured under the same conditions.

Figure 2:
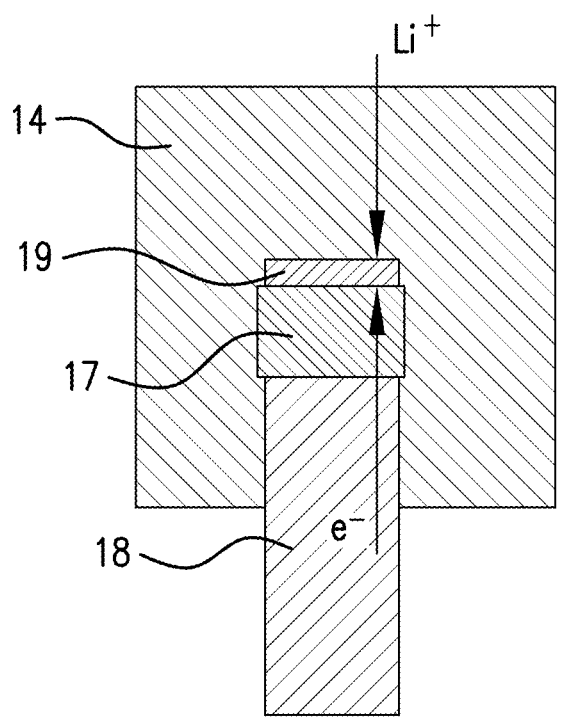
FIG. 2 is a schematic diagram illustrating the mechanism of a potential failure of a battery having an ionic conductive isolator.

If the buffer layer is not an electronic insulator relative to the solid-state electrolyte, lithium deposition may occur at the interface between the solid-state electrolyte and the buffer layer, resulting in detachment of the solid-state electrolyte from the surface of the buffer layer. While not wanting to be bound by theory, it is understood that, as illustrated in FIG. 2, if the buffer layer (17) is electronically conductive relative to the solid-state electrolyte, electrons (e⁻) can travel through the buffer layer (17) and encounter lithium ions (Li⁺) at the interface of the solid-state electrolyte (14) and the buffer layer (17), forming lithium metal (19). As cycling continues, the deposited lithium metal (19) can have a volume sufficient to result in a loss of contact between the solid-state electrolyte (14) and the porous negative electrode (18), contributing to battery failure.

In an aspect, the buffer layer is also an ionic insulator relative to the solid-state electrolyte. In an aspect, the buffer composition has an ionic conductivity that is less than or equal to $1\times10^{-6}$ times, less than or equal to $0.5\times10^{-6}$ times, less than or equal to $1\times10^{-7}$ times, or less than or equal to $1\times10^{-7}$ times an ionic conductivity of the solid-state electrolyte. In an aspect, the buffer composition has an ionic conductivity that is greater than or equal to $1\times10^{-14}$ times, greater than or equal to $1\times10^{-12}$ times, greater than or equal to $1\times10^{-10}$ times, or greater than or equal to $1\times10^{-8}$ times an ionic conductivity of the solid-state electrolyte. Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989. The ionic conductivity of the buffer composition and the ionic conductivity of the solid-state electrolyte are measured under the same conditions.

Figure 3:
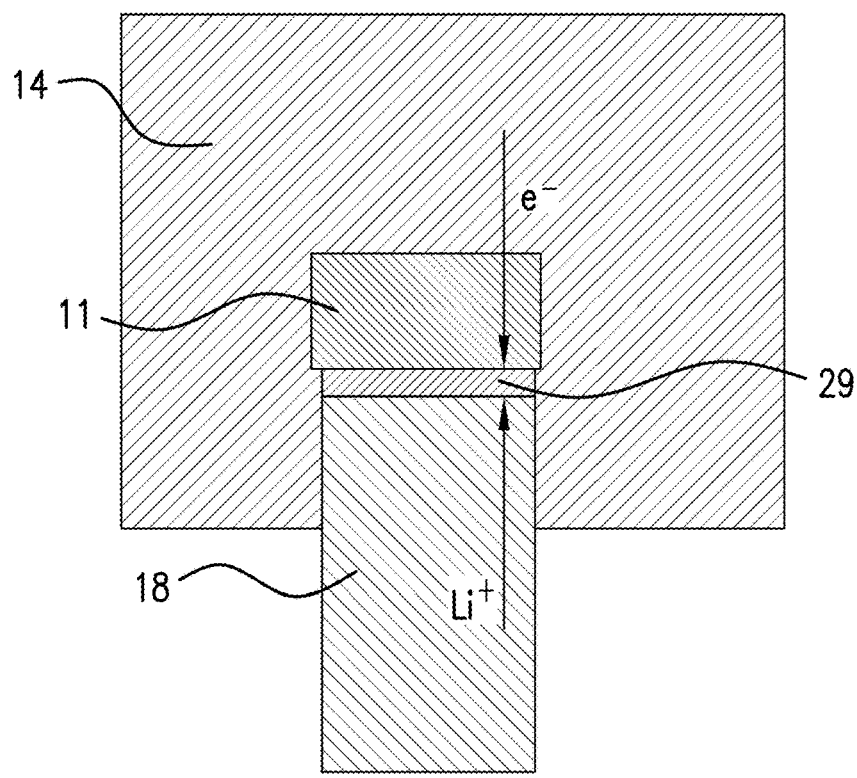
FIG. 3 is a schematic diagram illustrating the mechanism of a potential failure of a battery having an electronic conductive isolator.

If the buffer layer is not an ionic insulator relative to the solid-state electrolyte, the battery may fail after cycling. As illustrated in FIG. 3, when the buffer layer (11) is ionically conductive relative to the solid-state electrolyte (14), lithium ions (Li⁺) from the positive electrode can travel through the solid-state electrolyte (14) and the buffer layer (11) and encounter electrons (e⁻) at the interface (25) of the buffer layer (11) and the negative electrode (18), forming lithium metal (29). As the cycling continues, the volume of the deposited lithium metal (29) at the interface of the buffer layer (11) and the negative electrode (18) may be sufficient to lead to a loss of contact between the solid-state electrode (14) and the porous negative electrode (18), contributing to battery failure.

Figure 4:
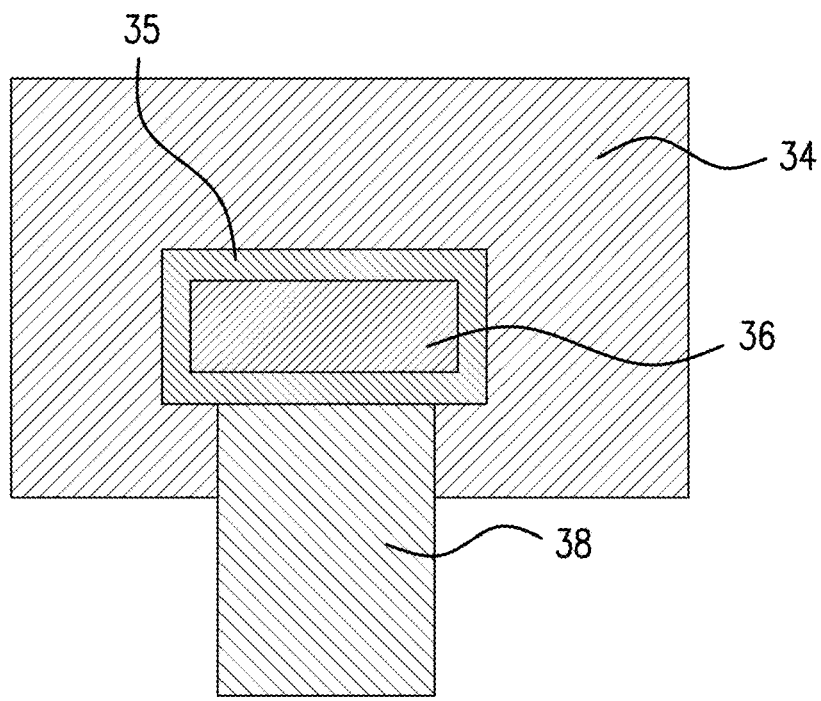
FIG. 4 is a schematic diagram illustrating the mechanism of a potential failure of a battery having a chemically active isolator.

In an aspect, the buffer layer is further stable, e.g., thermodynamically stable, when contacted with the negative electrode and the solid-state electrolyte. In other words, the buffer composition has minimal or no chemical reaction with the negative electrode active material or the solid-state electrolyte. If the buffer composition is not thermodynamically stable, a passivation layer (35) may form between the buffer layer (36) and the solid-state electrolyte (34) as shown in FIG. 4. In an aspect, the passivation layer may be undesirably resistive.

In an aspect the buffer layer composition is stable in the presence of or when contacted with lithium. In an aspect, the buffer composition has minimal or no discernable chemical reaction with the negative electrode active material or the solid-state electrolyte. In an aspect, in a phase diagram of the buffer layer composition and lithium, the buffer layer composition is directly connected to lithium with a tie-line, with no intervening compounds between lithium and the buffer layer composition.

The buffer layer can adhere to the solid-state electrolyte and the porous negative electrode. In an aspect, the buffer layer serves as a binder, between the solid-state electrode and the porous negative electrode. Preferably, the interface between the porous negative electrode and the buffer layer, and the interface between the buffer layer and the solid-state electrolyte both have an adhesion strength such that it is possible to transmit at least 10 MPa to 1 GPa tensile and shear stresses across these interfaces without detachment of the porous negative electrode from the solid-state electrode. In an aspect the adhesive force between the buffer layer and the solid-state electrolyte is greater than 0.5 N/m. Such adhesive force may be desirable in order to provide suitable adhesion between the solid-state electrode and the porous negative electrode.

In an aspect, the buffer composition has a bandgap of greater than 3 electron-volts (eV), or greater than 4 eV, and may be thermodynamically stable against the porous negative electrode, e.g., may be directly connected by a tie-line to lithium in the phase diagram and does not substantially support the transport of lithium ions.

The buffer composition comprises a binary compound, a ternary compound, a quaternary compound, or a combination thereof. In an aspect, the buffer layer comprises a buffer composition according to Formula (1)

$$M_m N_n Z_z H_h X_x \quad (1)$$

wherein

M is Na, K, Rb, Cs, Al, or a metal of Group 2 or 3, or a combination thereof, wherein m is 1, 2, 3, or 4, X is at least one halogen, and wherein x is 0, 1, 2, or 6, Z is O, S, or a combination thereof, and z is 0, 1, 2, 3, or 4, n is 0, 1, or 2, and h is 0, 1, 2, or 3, provided that x+z+n+h is at least 1.

As used herein, "Group" means a group of the Periodic Table of the Elements according to the International Union of Pure and Applied Chemistry ("IUPAC") Group 1-18 group classification system.

The Group 3 metal may comprise any suitable lanthanide or actinide, e.g., an element having an atomic number from 58 to 71, or 90 to 103.

M in Formula (1) can be K, Rb, Cs, Be, Ca, Sr, Ba, Sc, Y, Th, Al, Lu, Tm, Er, Ho, Dy, Tb, Sm, Nd, Pr, La, Yb, La, or Yb. Use of a lanthanide, such as Eu, Ho, Dy, or Lu is mentioned.

Specific examples of the buffer composition include BeO, $SrF_2$, KCl, CsCl, RbCl, $SrBr_2$, $ThO_2$, CsBr, RbBr, $Y_2O_3$, AlN, $Lu_2O_3$, $Tm_2O_3$, $Ba_4I_6O$, $Er_2O_3$, $Ho_2O_3$, $Dy_2O_3$, $Tb_2O_3$, CsI, KI, $Sm_2O_3$, $Sm_2O_2S$, RbI, $Nd_2O_3$, $Pr_2O_3$, CaO, $La_2O_3$, YbO, $BaI_2$, $Be_3N_2$, $La_2SO_2$, $YbF_2$, $CaH_2$, $SrBe_3O_4$, or $Pr_2SO_2$. Mentioned is use of $Er_2O_3$, $Ho_2O_3$, or $Dy_2O_3$. A combination comprising at least one of the foregoing may be used.

The buffer layer may have any suitable thickness. In an aspect, the buffer layer has a thickness of 5 to 50 nm, 20 to 40 nm, or 25 to 35 nm.

The porous negative electrode comprises a metal, a transition metal nitride, or a combination thereof. Examples of the metal and transition metal include gold, copper, nickel, aluminum, silver, titanium nitride, gallium nitride, molybdenum nitride, or a combination thereof.

The metal and transition metal can have a nanostructure. The term "nanostructure" as used herein means a material having a nanofiber structure, a nanorod structure, a nanowire structure, or a nanotube structure, or a nanobody, wherein at least one of the dimensions, i.e., a length, a diameter, or a width of the material may be nano-sized, that is, has a nanometer scale dimension. Optionally the porous negative electrode comprises ordered nanostructures of the metal, the transition metal nitride, or a combination thereof. In an aspect, the metal, the transition metal nitride, or a combination thereof has a nanostructure in the form of nanotubes.

The porous negative electrode may have a porosity of 50 to 95%, 55 to 80%, 60 to 75%, optionally 62 to 72%, or 65 to 70%, based on a total volume of the negative electrode. The porosity may be determined by scanning electron microscopy. Additional details may be determined by one of skill in the art without undue experimentation.

The porous negative electrode can have an average pore diameter of 25 nanometers (nm) to 400 nm, 50 nm to 300 nm, or 100 to 200 nm. The porous negative electrode may also have a wall thickness of 5 nm to 100 nm, 5 nm to 80 nm, 5 to 50 nm, or 5 to 20 nm. The average pore diameter and wall thickness may be determined by scanning electron microscopy, the details of which may be determined by one of skill in the art without undue experimentation.

Preferably the buffer layer may be disposed in a configuration to preserve the porosity of the porous negative electrode so that lithium may be deposited within the pores of the porous negative electrode. In an aspect, the buffer layer is a discontinuous layer and is on a portion of the surface of the porous negative electrode and configured to avoid blocking the pores of the porous negative electrode facing the solid-state electrolyte. Accordingly the buffer layer is on a portion of a surface of the porous negative electrode. In an aspect, the buffer layer is on 0.1 to 50%, 0.3 to 30%, or 0.5 to 10% of a surface of the porous negative electrode, based on a total surface area of the porous negative electrode. Alternatively or in addition, a portion of the solid-state electrolyte is directly exposed to a pore of the porous negative electrode.

In addition to the porous negative electrode and the buffer layer, the buffered negative electrode-electrolyte assembly also includes a solid-state electrolyte. Any suitable solid state electrolyte may be used. The solid state electrolyte may be, for example, an organic solid electrolyte, an inorganic solid electrolyte, or a combination thereof. Examples of the organic solid electrolyte may include polyethylene oxide or a derivative thereof, a polypropylene oxide or a derivative thereof, a phosphoric acid ester polymer, poly(L-lysine), polyester sulfide, a polyvinyl alcohol, a polyvinylidene fluoride, and polymers containing ionic dissociation groups. The inorganic solid electrolyte may be an oxide-containing solid electrolyte or a sulfide-containing solid electrolyte. Examples of the oxide-containing solid electrolyte include at least one of $Li_{1+x+y}Al_xTi_{2-x}Si_yP_{3-y}O_{12}$ (where $0<x<2$ and $0\leq y<3$), $BaTiO_3$, $Pb(Zr_aTi_{1-a})O_3$ (PZT) (where $0\leq a\leq 1$), $Pb_{1-x}La_xZr_{1-y}Ti_yO_3$ (PLZT) (where $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$ (where $0<x<2$ and $0<y<3$), $Li_xAl_yTi_z(PO_4)_3$ (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0\leq x\leq 1$, $0\leq y\leq 1$, $0\leq a\leq 1$, and $0\leq b\leq 1$), $Li_xLa_yTiO_3$ (where $0<x<2$ and $0<y<3$), $Li_2O$, LiOH, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ (where M is Te, Nb, or Zr, and $0\leq x\leq 10$). The oxide-containing solid electrolyte may be, for example, a garnet-type solid electrolyte, e.g., $Li_7La_3Zr_2O_{12}$ (LLZO) or $Li_{3-x}La_3Zr_{2-a}M_aO_{12}$ (M-doped LLZO, where M is Ga, W, Nb, Ta, or Al, and $0\leq x\leq 10$ and $0\leq a<2$). Use of a LISICON compound, e.g., $Li_{2+2x}Zn_{1-x}GeO_4$, wherein $0<x<1$ is also mentioned.

In an aspect, the solid electrolyte may be, for example, a sulfide-containing solid electrolyte. Examples of the sulfide-containing solid electrolyte may include at least one of $Li_2S$—$P_2S_5$, $Li_2S$—$P_2S_5$—LiX (where X is a halogen element), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n each are a positive number, Z represents any of Ge, Zn, and Ga), $Li_2S$—$GeS_2$, $Li_2S$—$SiS_2$—$Li_3PO_4$, $Li_2S$—$SiS_2$—$Li_pMO_q$ (where p and q each are a positive number, M represents at least one of P, Si, Ge, B, Al, Ga, or In), $Li_{7-x}PS_{6-x}Cl_x$ (where $0\leq x\leq 2$), $Li_{7-x}PS_{6-x}Br_x$ (where $0\leq x\leq 2$), or $Li_{7-x}PS_{6-x}I_x$ (where 0≤x≤2). The sulfide-containing solid electrolyte may be prepared by melting and quenching starting materials (e.g., $Li_2S$ or $P_2S_5$), or mechanical milling the starting materials. Subsequently, the resultant may be heat-treated. The sulfide-containing solid electrolyte may be amorphous or crystalline and may be a mixed form thereof.

Also, the sulfide-containing solid electrolyte may include at least sulfur (S), phosphorus (P), and lithium (Li), as component elements among the sulfide-containing solid electrolyte materials. For example, the sulfide-containing solid electrolyte may be a material including $Li_2S$—$P_2S_5$. Here, when the material including $Li_2S$-$P_2S_5$ is used as a sulfide-containing solid electrolyte material, a mixing molar ratio of $Li_2S$ and $P_2S_5$ ($Li_2S$:$P_2S_5$) may be, for example, selected in a range of about 50:50 to about 90:10.

For example, the sulfide-containing solid electrolyte may include an argyrodite-type solid electrolyte represented by Formula (2):

$$Li^+_{12-n-x}A^{n+}X^{2-}_{6-x}Y^-_x \quad (2)$$

In Formula (2), A is at least one of P, As, Ge, Ga, Sb, Si, Sn, Al, In, Ti, V, Nb, or Ta, X is at least one of S, Se, or Te, Y is at least one of Cl, Br, I, F, CN, OCN, SCN, or $N_3$, 1≤n≤5, and 0≤x≤2.

The sulfide-containing solid electrolyte may be an argyrodite-type compound including at least one of $Li_{7-x}PS_{6-x}Cl_x$ (where 0≤x≤2), $Li_{7-x}PS_{6-x}Br_x$ (where 0≤x≤2), or $Li_{7-x}PS_{6-x}I_x$ (where 0≤x≤2). Particularly, the sulfide-containing solid electrolyte in the solid electrolyte layer 30 may be an argyrodite-type compound including at least one of $Li_6PS_5Cl$, $Li_6PS_5Br$, or $Li_6PS_5I$.

The buffered negative electrode-electrolyte assembly can be manufactured by sputtering the buffer composition on the porous negative electrode to form a coated porous negative electrode; and disposing a solid-state electrolyte on the coated porous negative electrode to manufacture the buffered negative electrode-electrolyte assembly.

Also disclosed is an electrochemical cell (10), such as a lithium battery, comprising a positive electrode (12); and the buffered negative electrode-electrolyte assembly (15) as described herein on the positive electrode (12).

Figure 9:
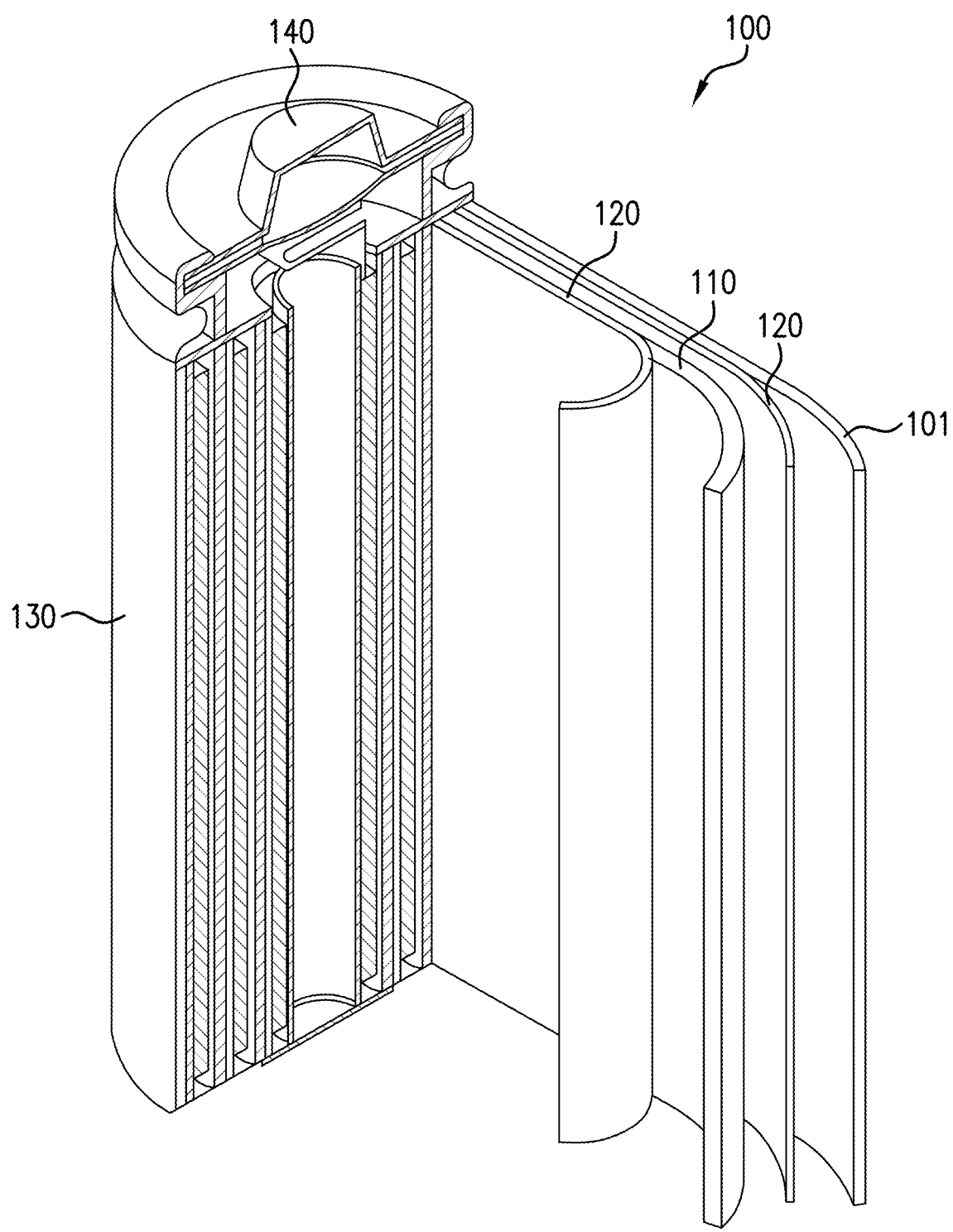
FIG. 9 is a schematic diagram of an embodiment of a lithium battery.

A schematic diagram of a lithium battery is provided in FIG. 9. As shown in the battery 100 of FIG. 9, a positive electrode 110 can be used in combination with a buffered negative electrode-electrolyte assembly which includes a porous negative electrode 101, a solid-state electrolyte 120, wherein the buffer layer is between the porous negative electrode 101 and solid-state electrolyte 120. The positive electrode and the buffered negative electrode-electrolyte assembly can be wound or folded and accommodated in a battery case or pouch 130. The battery can also include a cap 140.

The positive electrode may comprise a positive active material layer including a positive active material on a current collector. The current collector may comprise aluminum, for example. The positive electrode may be prepared by screen printing, slurry casting, or powder compression of the positive active material on the current collector to provide the positive electrode. However, the method of preparing the positive electrode is not limited thereto, and any suitable method may be used.

The positive active material can comprise a lithium transition metal oxide, or a transition metal sulfide. For example, the positive active material can be a compound represented by any of the Formulas: $Li_aA_{1-b}M_bD_2$ wherein 0.90≤a≤1.8 and 0≤b≤0.5; $Li_aE_{1-b}M_bO_{2-c}D_c$ wherein 0.90≤a≤1.8, 0≤b≤0.5, and 0≤c≤0.05; $LiE_{2-b}M_bO_{4-c}D_c$ wherein 0≤b≤0.5 and 0≤c≤0.05; $Li_aNi_{1-b-c}Co_bM_cD_{\alpha a}$ wherein 0.90≤a≤1.8, 0≤b≤0.5, 0≤c≤0.05, and 0<α≤2; $Li_aNi_{1-b-c}Co_bM_cO_{2-\alpha}X_\alpha$ wherein 0.90≤a≤1.8, 0≤b≤0.5, 0≤c≤0.05, and 0<α<2; $Li_aNi_{1-b-c}Co_bM_cO_{2-\alpha}X_2$ wherein 0.90≤a≤1.8, 0≤b≤0.5, 0≤c≤0.05, and 0<α<2; $Li_aNi_{1-b-c}Mn_bM_cD_\alpha$ wherein 0.90≤a≤1.8, 0≤b≤0.5, 0≤c≤0.05, and 0<α≤2; $Li_aNi_{1-b-c}Mn_bM_cO_{2-\alpha}X_\alpha$ wherein 0.90≤a≤1.8, 0≤b≤0.5, 0≤c≤0.05, and 0<α<2; $Li_aNi_{1-b-c}Mn_bM_cO_{2-\alpha}X_2$ wherein 0.90≤a≤1.8, 0≤b≤0.5, 0≤c≤0.05, and 0<α<2; $Li_aNi_bE_cG_dO_2$ wherein 0.90≤a≤1.8, 0≤b≤0.9, 0≤c≤0.5, and 0.001≤d≤0.1; $Li_aNi_bCo_cMn_dGeO_2$ wherein 0.90≤a≤1.8, 0≤b≤0.9, 0≤c≤0.5, 0≤d≤0.5, and 0.001≤e≤0.1; $Li_aNiG_bO_2$ wherein 0.90≤a≤1.8 and 0.001≤b≤0.1; $Li_aCoG_bO_2$ wherein 0.90≤a≤1.8 and 0.001≤b≤0.1; $Li_aMnG_bO_2$ where 0.90≤a≤1.8 and 0.001≤b≤0.1; $Li_aMn_2G_bO_4$ wherein 0.90≤a≤1.8 and 0.001≤b≤0.1; $QO_2$; $QS_2$; $LiQS_2$; $V_2O_5$; $LiV_2O_2$; $LiRO_2$; $LiNiVO_4$; $Li_{(3-f)}J_2(PO_4)_3$ (0≤f≤2); $Li_{(3-f)}Fe_2(PO_4)_3$ wherein 0≤f≤2; and $LiFePO_4$, in which in the foregoing positive active materials A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; and J is V, Cr, Mn, Co, Ni, or Cu. Examples of the positive active material include $LiCoO_2$, $LiMn_xO_{2x}$ where x=1 or 2, $LiNi_{1-x}Mn_xO_{2x}$ where 0<x<1, $LiNi_{1-x-y}Co_xMn_yO_2$ where 0≤x≤0.5 and 0≤y≤0.5, $LiFePO_4$, $TiS_2$, $FeS_2$, $TiS_3$, and $FeS_3$. For example, the positive active material can include a composite oxide of lithium and a metal selected from cobalt, manganese, and nickel. Mentioned are NMC 811 ($LiNi_{0.8}Mn_{0.1}Co_{0.1}O_2$), NMC 622 ($LiNi_{0.6}Mn_{0.2}Co_{0.2}O_2$), NMC 532 ($LiNi_{0.5}Mn_{0.3}Co_{0.2}O_2$), and NCA ($LiNi_{0.8}Co_{0.15}Al_{0.05}O_2$).

The positive active material layer may further include a conductive agent and a binder. Any suitable conductive agent and binder may be used.

A binder can facilitate adherence between components of the electrode, such as the positive active material and the conductor, and adherence of the electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the electrode to the current collector may be suitably strong.

The conductive agent can include, for example, carbon black, carbon fiber, graphite, carbon nanotubes, graphene, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used.

Figure 5:
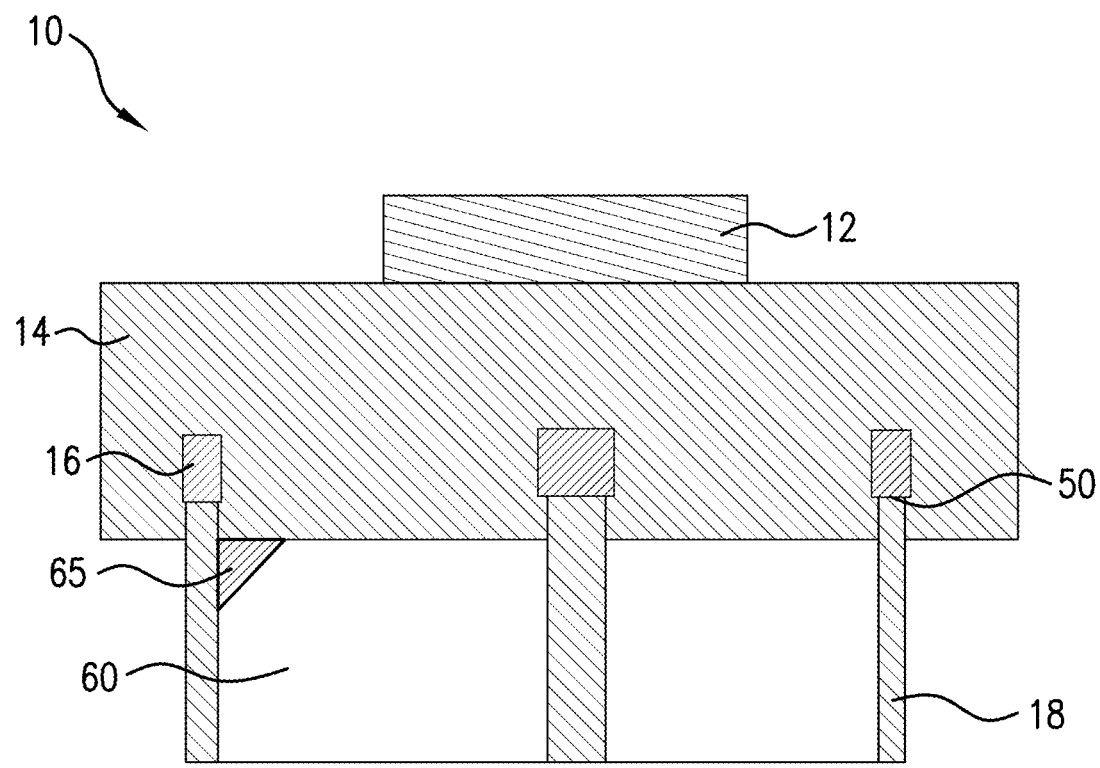
FIG. 5 is a schematic diagram of an embodiment of an electrochemical cell including a buffer layer disposed on the roots of the nanostructures in a negative electrode.
Figure 6:
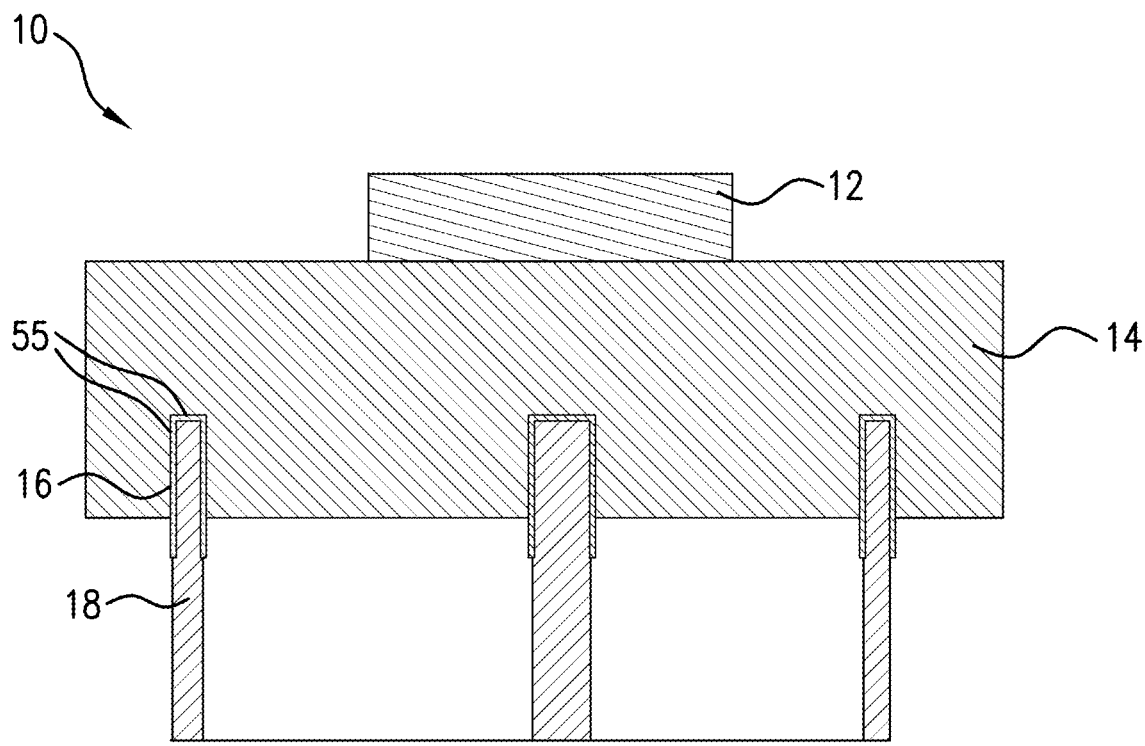
FIG. 6 is a schematic diagram of an embodiment of an electrochemical cell including a buffer layer forming a conformal coating on a negative electrode.

Specific examples of buffered negative electrode-electrolyte assembly are illustrated in FIGS. 5 and 6. In an aspect, the buffer layer (16) may be disposed on the root (50) of the nanostructure in the porous negative electrode (18) as shown in FIG. 5. In another aspect, the buffer layer may be a conformal coating (55) and be disposed on the root of the nanostructure of the porous negative electrode (18) as shown in FIG. 6. While not wanting to be bound by theory, it is understood that as the cell is cycled, lithium may deposit in the pore (60) of the porous negative electrode (18), e.g., within the pore (18) and on a surface of the solid electrolyte (18) facing the negative electrode. Because the lithium is deposited in the pore of the porous negative electrode, the volume of the lithium can be accommodated, avoiding detachment of the solid-state electrolyte from the porous negative electrode as the volume of the deposited lithium increases. Also, by avoiding deposition of lithium at the root of the porous negative electrode, the bond between the solid state electrolyte and the root of the nanostructured negative electrode provided by the buffer layer is preserved. While not wanting to be bound by theory, it is understood that these features contribute to the observed improved cell performance.

An electrochemical cell can be manufactured by disposing a buffer layer as described herein between a solid-state electrolyte and a porous negative electrode to form buffered negative electrode-electrolyte assembly and disposing a positive electrode on the solid-state electrolyte to manufacture the electrochemical cell.

Hereinafter an embodiment is described in further detail. The examples are provided for illustrative purposes only and are not intended to limit the scope of the present disclosure.

EXAMPLES

Example 1: Preparation of Erbium (III) Oxide Coated Titanium Nitride Electrode

Sputtering of $Er_2O_3$ is achieved with an RF power supply (e.g. Dressler RFX600A) under inert gas at around 40 mtorr pressure, after evacuating the chamber at least to a vacuum of $10^{-6}$ torr. TiN substrates were preloaded into the chamber with a $Er_2O_3$ target installed. TiN were then coated with $Er_2O_3$ with a rate of around 0.5 Å/s.

Figure 7A:
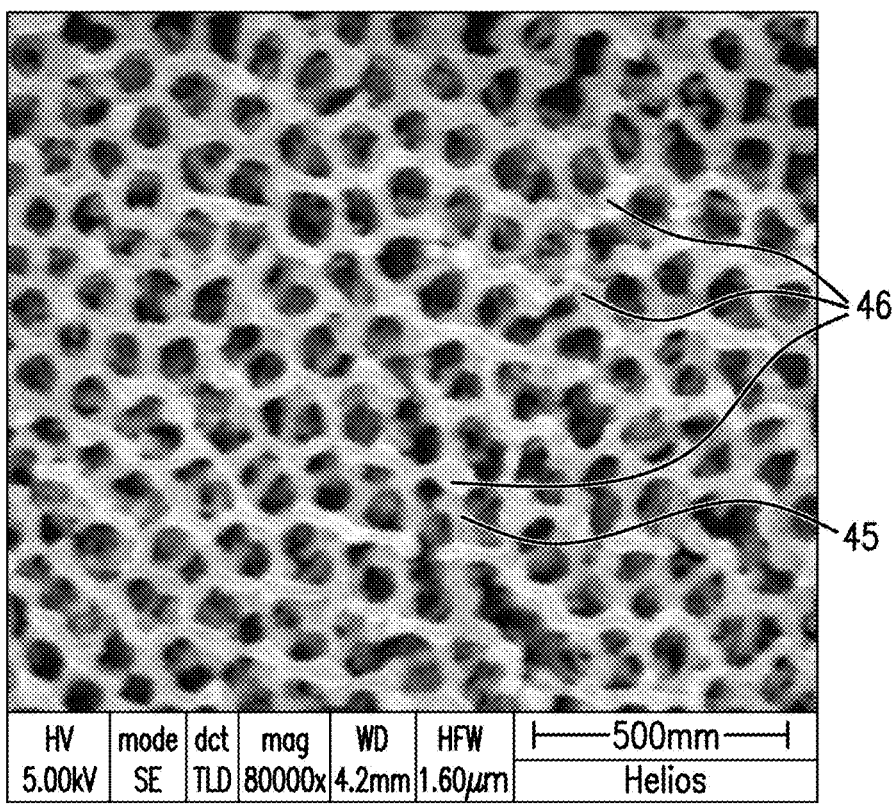
FIG. 7A and FIG. 7B are scanning electron microscopy (SEM) images of erbium (III) oxide coated titanium nitride electrode of Example 1.
Figure 7B:
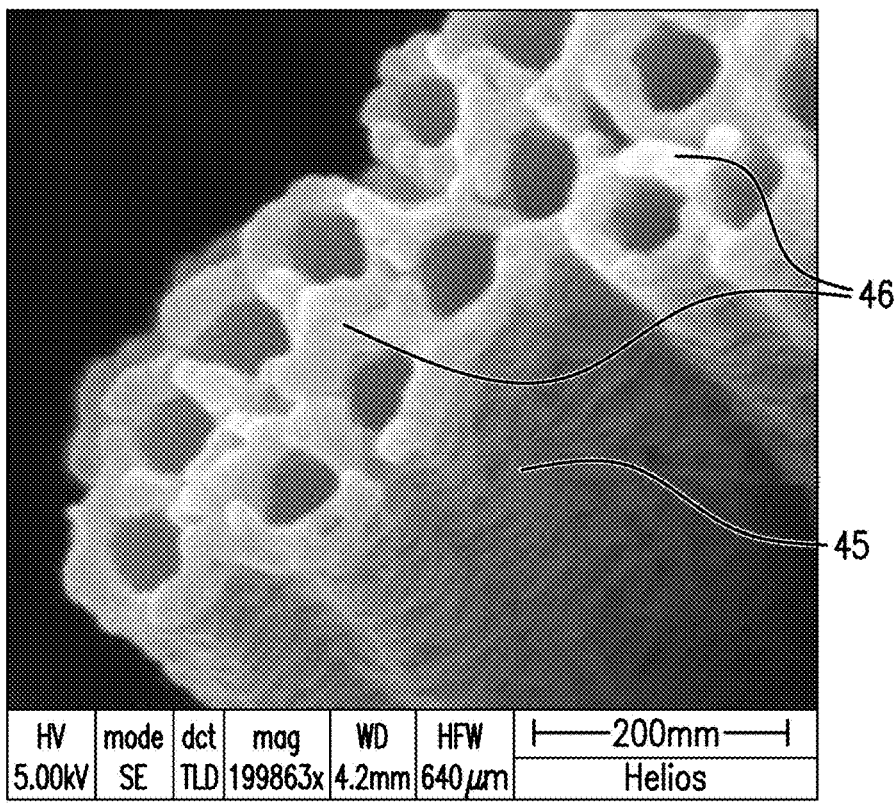

The erbium (III) oxide coated titanium nitride electrode was analyzed using scanning electron microscopy (SEM) (e.g. JEOL 5910). The results are shown in FIGS. 7A and 7B. The figures show that $Er_2O_3$ (46) is coated on the root of the titanium nitride nanostructures (45). $Er_2O_3$ coating can be identify by a brighter hue due to its electronic insulating properties.

Example 2: Preparation of Lithium Batteries

A coin cell battery was assembled in an argon atmosphere with erbium (III) oxide coated titanium nitride electrode, PEO (polyethylene oxide) film as electrolyte, and lithium metal disk as source for lithium ions. The cell was cycled at 60° C. at a current density of 0.5 mA/cm².

Figure 8B:
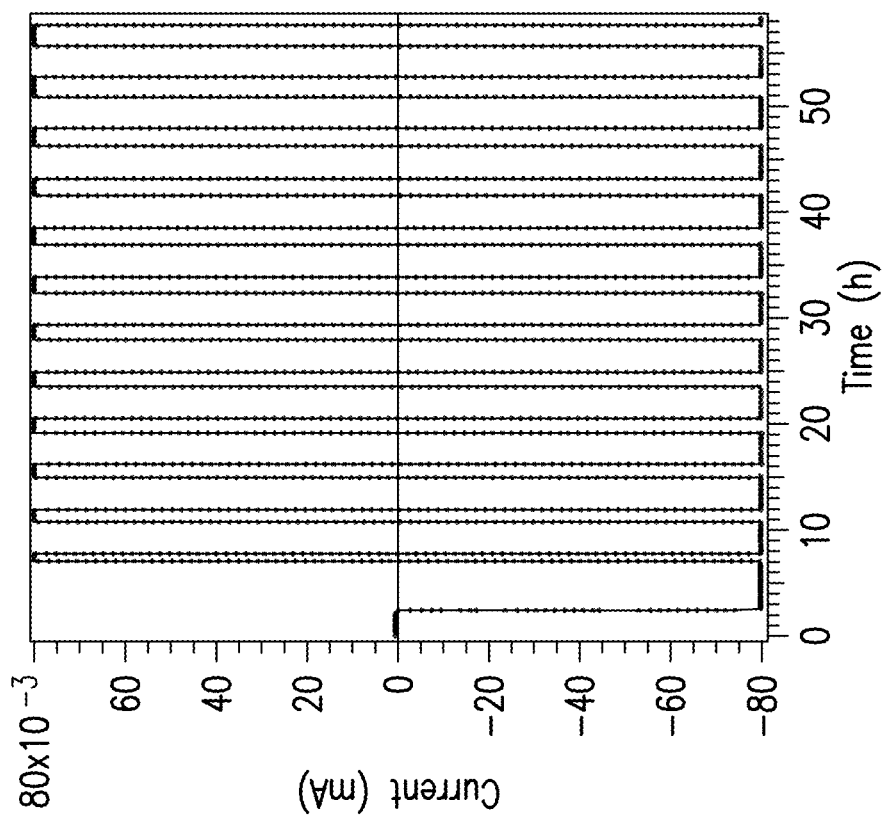
FIG. 8B is a graph of current (milliamperes) versus time (hours) showing the current when obtaining the results shown in FIG. 8A.
Figure 8A:
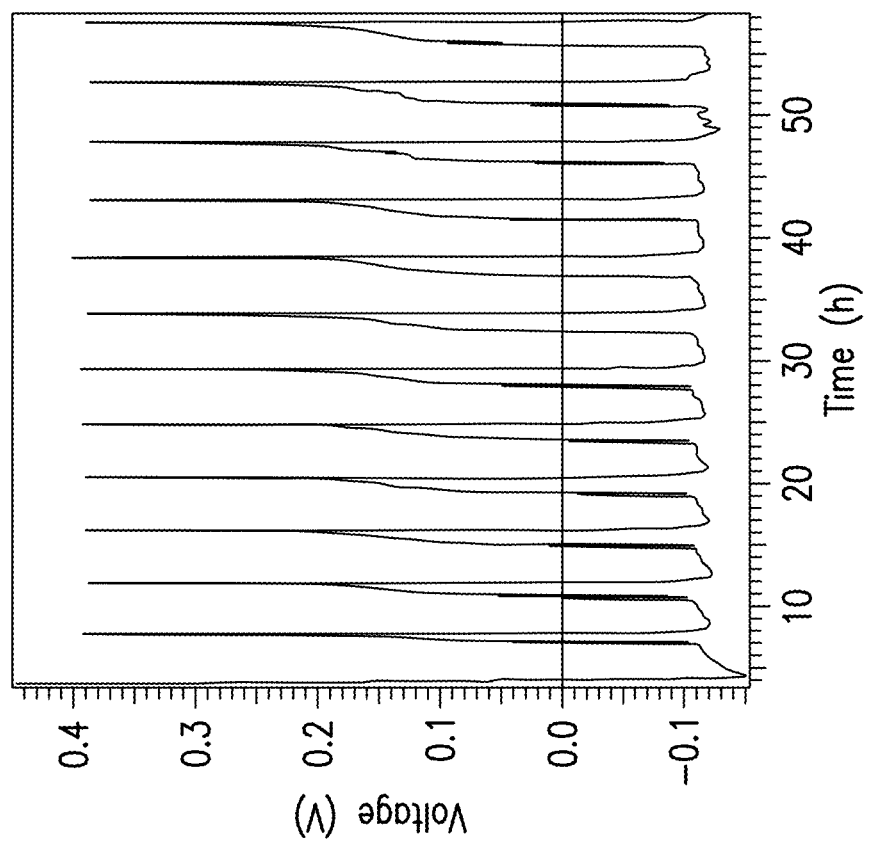
FIG. 8A is a graph of voltage (volts) versus time (hours) illustrating the results of charging and discharging an electrochemical cell having a buffered negative electrode-electrolyte assembly.

The results are shown in FIGS. 8A and FIG. 8B. The electrochemical characterization shows that cell with the buffer layer can cycle for >50 hours at 0.05 mA/cm².

Comparative Example 1

A cell will be assembled using the same method as in Example 1, but without buffer layer. The cell without the buffer layer will not be able to be cycled.

Various embodiments are shown in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While a particular embodiment has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A buffered negative electrode-electrolyte assembly comprising:
    a porous negative electrode comprising a metal, a transition metal nitride, or a combination thereof;
    a solid-state electrolyte; and
    a buffer layer between the porous negative electrode and the solid-state electrolyte, the buffer layer comprising a buffer composition according to Formula (1)

$$M_n N_n Z_z H_h X_x \quad (1)$$

wherein
    M is Na, K, Rb, Cs, Al, or a metal of Group 2 or 3, or a combination thereof, wherein m is 1, 2, 3, or 4,
    X is at least one halogen and wherein x is 0, 1, 2, or 6,
    Z is O, S, or a combination thereof, and z is 0, 1, 2, 3, or 4,
    n is 0, 1, or 2, and
    h is 0, 1, 2, or 3,
    provided that x+z+n+h is at least 1, and
    wherein the buffer composition has an electronic conductivity that is less than or equal to $1\times10^{-2}$ times an electronic conductivity of the solid-state electrolyte, and the buffer composition has an ionic conductivity less than or equal to $1\times10^{-6}$ times an ionic conductivity of the solid-state electrolyte.

2. The assembly of claim 1, wherein the buffer composition has a bandgap greater than 3 electron-volts.

3. The assembly of claim 1, wherein the buffer composition comprises a binary compound.

4. The assembly of claim 1, wherein M in Formula (1) is K, Rb, Cs, Be, Ca, Sr, Ba, Sc, Y, Th, Al, Lu, Tm, Er, Ho, Dy, Tb, Sm, Nd, Pr, La, Yb, La, or Yb.

5. The assembly of claim 1, wherein the buffer composition comprises at least one of BeO, $SrF_2$, KCl, CsCl, RbCl, $SrBr_2$, $ThO_2$, CsBr, RbBr, $Y_2O_3$, AlN, $Lu_2O_3$, $Tm_2O_3$, $Ba_4I_6O$, $Er_2O_3$, $Ho_2O_3$, $Dy_2O_3$, $Tb_2O_3$, CsI, KI, $Sm_2O_3$, $Sm_2O_2S$, RbI, $Nd_2O_3$, $Pr_2O_3$, CaO, $La_2O_3$, YbO, $BaI_2$, $Be_3N_2$, $La_2SO_2$, $YbF_2$, $CaH_2$, $SrBe_3O_4$, or $Pr_2SO_2$.

6. The assembly of claim 1, wherein the buffer layer has a thickness of 5 to 50 nm.

7. The assembly of claim 1, wherein the buffer layer is a conformal coating on a surface of the porous negative electrode.

8. The assembly of claim 1, wherein the buffer layer is on a portion of a surface of the porous negative electrode.

9. The assembly of claim 1, wherein a portion of the solid-state electrolyte is directly exposed to a pore of the porous negative electrode.

10. The assembly of claim 1, wherein the porous negative electrode has an average pore diameter between 25 nm and 400 nm and a wall thickness of 5 nm to 100 nm.

11. The assembly of claim 1, wherein the porous negative electrode has a porosity of 60% to 75%.

12. The assembly of claim 1, wherein the porous negative electrode comprises the transition metal nitride.

13. The assembly of claim 1, wherein the solid-state electrolyte comprises an organic solid electrolyte, an oxide-containing inorganic solid electrolyte, a sulfide-containing inorganic solid electrolyte, or a combination thereof.

14. An electrochemical cell comprising:
    a positive electrode; and
    the buffered negative electrode-electrolyte assembly of claim 1 on the positive electrode.

15. The electrochemical cell of claim 14, wherein the positive electrode comprises a lithium transition metal oxide, a lithium transition metal phosphate, or a combination thereof.

16. A method of manufacturing a electrochemical cell, the method comprising:
    disposing a buffer layer between a solid-state electrolyte and a porous negative electrode, the porous negative electrode comprising a metal, a transition metal nitride, or a combination thereof, to form a buffered negative electrode-electrolyte assembly; and
    disposing a positive electrode on the solid-state electrolyte to manufacture the electrochemical cell,
    wherein the buffer layer comprises a buffer composition according to Formula (1)

$$M_n N_n Z_z H_h X_x \quad (1)$$

wherein
    M is Na, K, Rb, Cs, Al, a metal of Group 2 or 3, or a combination thereof, wherein m is 1, 2, 3, or 4,
    X is at least one halogen and wherein x is 0, 1, 2, or 6,
    Z is O, S, or a combination thereof, and z is 0, 1, 2, 3, or 4,
    n is 0, 1, or 2, and
    h is 0, 1, 2, or 3,
    provided that x+z+n+h is at least 1, and
    wherein
        the buffer composition has an electronic conductivity that is $1\times10^{-8}$ to $1\times10^{-2}$ times an electronic conductivity of the solid-state electrolyte, and
        the buffer composition has an ionic conductivity less than or equal to $1\times10^{-6}$ times an ionic conductivity of the solid-state electrolyte.

17. The assembly of claim 1, wherein when M is Sr, z+n+h is at least 1, and when M is Al or Y, x+n+h is at least 1.

18. The assembly of claim 1, wherein M in Formula (1) is K, Rb, Cs, Be, Ca, Ba, Sc, Th, Lu, Tm, Er, Ho, Dy, Tb, Sm, Nd, Pr, La, La, or Yb.

19. The assembly of claim 1, wherein M in Formula (1) is Eu, Ho, Dy, or Lu.

20. The assembly of claim 1, wherein the buffer composition comprises at least one of BeO, KCl, CsCl, RbCl, $SrBr_2$, $ThO_2$, CsBr, RbBr, AlN, $Lu_2O_3$, $Tm_2O_3$, $Ba_4I_6O$, $Er_2O_3$, $Ho_2O_3$, $Dy_2O_3$, $Tb_2O_3$, CSI, KI, $Sm_2O_3$, $Sm_2O_2S$, RbI, $Nd_2O_3$, $Pr_2O_3$, CaO, $La_2O_3$, YbO, $BaI_2$, $Be_3N_2$, $La_2SO_2$, $YbF_2$, $CaH_2$, $SrBe_3O_4$, or $Pr_2SO_2$.

* * * * *